No. 750,449. PATENTED JAN. 26, 1904.
W. J. GILLARD.
DEPTH SCALE.
APPLICATION FILED AUG. 6, 1903.
NO MODEL.

Witnesses.
A. H. Opsahl.
N. D. Kilgore.

Inventor.
William J. Gillard.
By his Attorneys
Williamson & Merchant

No. 750,449. Patented January 26, 1904.

UNITED STATES PATENT OFFICE.

WILLIAM J. GILLARD, OF MINNEAPOLIS, MINNESOTA.

DEPTH-SCALE.

SPECIFICATION forming part of Letters Patent No. 750,449, dated January 26, 1904.

Application filed August 6, 1903. Serial No. 168,399. (No model.)

*To all whom it may concern:*

Be it known that I, WILLIAM J. GILLARD, a citizen of the United States, residing at Minneapolis, in the county of Hennepin and State of Minnesota, have invented certain new and useful Improvements in Depth-Scales; and I do hereby declare the following to be a full, clear, and exact description of the invention, such as will enable others skilled in the art to which it appertains to make and use the same.

My invention has for its object to provide an improved scale for measuring the depths of holes or depressions, and especially of counterbored holes; and to this end the invention consists of the novel devices and combinations of devices hereinafter described, and defined in the claim.

The invention is illustrated in the accompanying drawings, wherein like characters indicate like parts throughout the several views.

Figure 1:
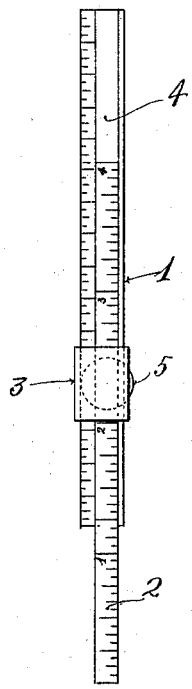
Figure 2:
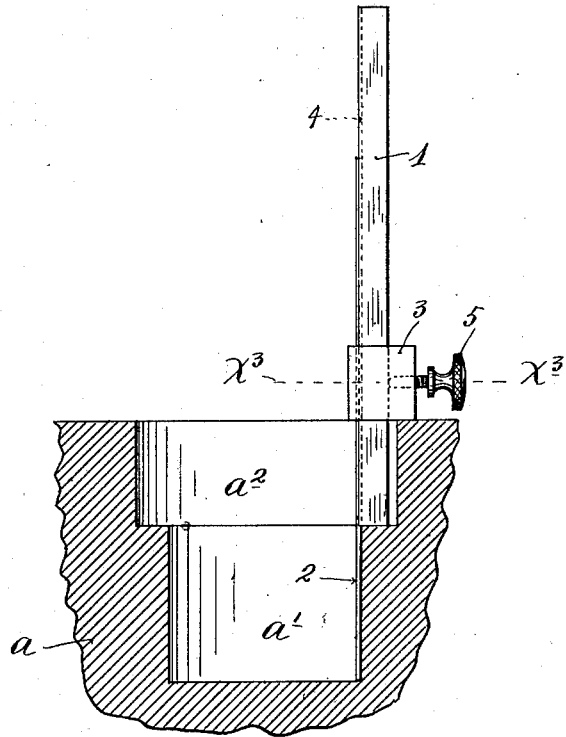

Figure 1 is a view in front elevation, showing my improved scale. Fig. 2 is a view, partly in side elevation and partly in section, showing the scale applied to measure the depth of a counterbored hole; and Fig. 3 is a detail in horizontal section taken through the scale on the line $x^3$ $x^3$ of Fig. 2.

In Fig. 2 the character $a$ indicates a casting or other body in which there is a counterbored hole $a'$ $a^2$.

My improved scale is made up of three principal parts—to wit, a primary or body scale 1, a supplemental or extensible scale 2, and a clamping-head 3. The body-scale 1 is provided on one face with a longitudinal groove or channel 4, in which the secondary scale 2 is mounted to slide with its outer face projecting slightly beyond the face of the said body-scale 1. The faces of both scales 1 and 2 are graduated in inches and fractions thereof, as shown in Fig. 1, and both of the said scales are preferably of the same length.

Figure 3:
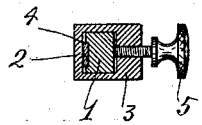

The sliding block 3 is perforated and embraces the body-scale 1 and the supplemental or sliding scale 2, as best shown in Fig. 3. A set-screw or thumb-screw 5 works through the back of the block 3 and impinges against the back of the body-scale 1. As is evident, when the set-screw 5 is tightened the supplemental scale 2 will be firmly clamped against the body-scale 1 and held against movements with respect thereto, and at the same time the said sliding block 3 will be held against sliding movement with respect to the body-scale. It will of course be understood that if desired a shoe or presser-foot may be placed between the end of the set-screw 5 and the back of said body-scale 1.

The scale described is capable of use in a great many different ways and may be used to measure at either end thereof. One way of using the scale to measure the depth at both diameters of the counterbored hole $a'$ $a^2$ is indicated in Fig. 2, wherein the supplemental scale 2 is extended down to the bottom of the hole $a'$, the downturned end of the body-scale 1 is forced against the shoulder at the bottom of the counterbored section $a^2$, and the lower portion of the sliding block 3 is forced against the surface of the body $a$. As is evident, in this way the exact depths of the two sections of the hole are registered on the scale, so that the said dimensions may be read in inches and fractions thereof or may be measured in another place by the direct application of the scale. With the scale applied as shown in Fig. 2 the entire depth of the hole is indicated by the intersection of the lower portion of the sliding block 3 with the graduations of the supplemental scale 2, the depth of the lower and smaller section $a'$ of the hole is indicated by the intersection of the lower end of the body 1 with the graduations of the scale 2, and the depth of the counterbored section $a^2$ of the hole is indicated by the intersection of the sliding head or clamp 3 with the graduations of the body-scale 1. Furthermore, if it is desired to bore a counterbored hole, or other hole for that matter, predetermined depths the scale may be set for such depths and applied to the hole which is being bored to indicate when the proper depths have been reached. As both of the scales extend in the same direction and hence occupy but very little space transversely they may be inserted deep into quite small holes. Furthermore, the sliding block and its thumbscrew 5 may be inserted into a hole of comparatively small diameter.

The scale described is of comparatively small cost, may be adjusted so that it occupies but very little space, and in practice has been found extremely efficient for the purpose had in view.

What I claim, and desire to secure by Letters Patent of the United States of America, is as follows:

A depth-scale comprising a graduated body-scale 1, having the longitudinal groove 4, the graduated supplemental scale 2 slidably mounted in said groove 4, and the clamp 3 embracing the two scales and slidably mounted thereon, said clamp having the screw 5 for holding the same and the said two scales in various adjustments, substantially as described.

In testimony whereof I have affixed my signature in presence of two witnesses.

WILLIAM J. GILLARD.

Witnesses:
ROBERT C. MABEY,
F. D. MERCHANT.